(12) United States Patent
Jeon et al.

(10) Patent No.: US 7,944,527 B2
(45) Date of Patent: May 17, 2011

(54) LIQUID CRYSTAL DISPLAY DEVICE WITH PARTICULAR LED ARRANGEMENT IN BACKLIGHT UNIT

(75) Inventors: Wook Jeon, Daejeon (KR); Jae-Won Shin, Busan (KR); Jun Ho Bae, Chilgok-Gun (KR)

(73) Assignee: LG Display Co., Ltd., Seoul (KR)

( * ) Notice: Subject to any disclaimer, the term of this patent is extended or adjusted under 35 U.S.C. 154(b) by 380 days.

(21) Appl. No.: 12/240,548

(22) Filed: Sep. 29, 2008

(65) Prior Publication Data

US 2009/0256987 A1    Oct. 15, 2009

(51) Int. Cl.
  *G02F 1/1335*    (2006.01)
  *G02F 1/1333*    (2006.01)
(52) U.S. Cl. ............... 349/65; 349/61; 349/62; 349/58
(58) Field of Classification Search .............. 349/65, 349/61, 62, 58
  See application file for complete search history.

(56) References Cited

U.S. PATENT DOCUMENTS

| | | | |
|---|---|---|---|
| 7,195,364 B2* | 3/2007 | Hahm et al. ............ | 362/27 |
| 7,377,682 B2* | 5/2008 | Chang et al. ............ | 362/633 |
| 7,609,334 B2* | 10/2009 | Lee ............ | 349/58 |
| 7,800,707 B2* | 9/2010 | Hsieh ............ | 349/58 |
| 2007/0019439 A1* | 1/2007 | Yu et al. ............ | 362/621 |
| 2008/0049443 A1 | 2/2008 | Lee | |
| 2010/0085506 A1* | 4/2010 | Kim et al. ............ | 349/61 |

FOREIGN PATENT DOCUMENTS

| CN | 1687826 A | 10/2005 |
|---|---|---|
| CN | 101131506 A | 2/2007 |

* cited by examiner

*Primary Examiner* — Mike Qi

(74) *Attorney, Agent, or Firm* — Birch, Stewart, Kolasch & Birch, LLP

(57) ABSTRACT

A LCD device according to an embodiment of the present invention includes a LCD panel including liquid crystal, and a backlight unit including a light emitting diode (LED) array including a plurality of LEDs, the plurality of LEDs having a peripheral LED disposed at a peripheral end of the LED array, and a light guide plate disposed below the LCD panel, each LED having a light emission surface to emit light to a light incidence surface of the light guide plate. The emission surface of the peripheral LED completely covers a peripheral end of the light incidence surface, the peripheral end of the light incidence surface being an area adjacent to a lateral surface of the light guide plate.

21 Claims, 7 Drawing Sheets

C

LIQUID CRYSTAL DISPLAY DEVICE WITH PARTICULAR LED ARRANGEMENT IN BACKLIGHT UNIT

RELATED APPLICATION

The present disclosure relates to subject matter contained in priority Korean Application No. 10-2008-0033342, filed on Apr. 10, 2008, which is herein expressly incorporated by reference in its entirety.

BACKGROUND OF THE INVENTION

1. Field of the Invention

The present invention relates to a Liquid Crystal Display device, and particularly, to a Liquid Crystal Display device which is capable of removing an inferior color split phenomenon at outer portions and edge portions of a light guide plate by mixing desired colors in the light guide plate and exiting light resulting from disposing lateral surfaces of the light guide plate and ends of light emission surfaces of light emitting devices disposed at both ends of a light emitting device array to be consistent with each other.

2. Discussion of the Related Art

Recently, a Cathode Ray Tube (CRT), one of display devices generally used, is mainly used for monitors of a television, a measuring apparatus, information terminal apparatus, etc. However, the CRT cannot be actively applied to electronic products having a small size and a light weight due to the CRT's weight and size. Thus, the CRT has a limitation in following a trend that various electronic products become small and light. As a substitute the CRT, there are a Liquid Crystal Display (LCD) device using an optical effect of an electric field, a Plasma Display Panel (PDP) using an electric discharge of gas, and an Electro Luminescence Display (ELD) device using a light-emitting effect of an electric field. Among these display devices, the LCD device is being actively researched.

In order to substitute the CRT, the LCD device having advantages such as a small size, a light weight and a low power consumption has been developed to be sufficient to serve as a flat panel display device, recently. Thus, the LCD device is used for a monitor of a desktop computer and as a large-sized information display device, and as a display device for many other purposes. Accordingly, the demand for the LCD device is continuously increasing.

The LCD device can be largely divided into a liquid crystal display panel for displaying images and a driving unit for applying driving signals to the liquid crystal display panel. The liquid crystal display panel includes first and second glass substrates combined with each other with a predetermined space therebetween and a liquid crystal layer infused between the first and second glass substrates.

Meanwhile, since the LCD device is mostly implemented as a light-receiving device displaying images by adjusting the amount of a light source, it is necessary to have a separate light source for irradiating a light onto the liquid crystal panel, which is a backlight. The backlight is classified into an edge type and a direct type according to a position where a lamp unit is installed.

The light source may be implemented as an Electro Luminescence (EL), a Light Emitting Diode (LED), a Cold Cathode Fluorescent Lamp (CCFL), an External Electrode Fluorescent Lamp (EEFL), and etc. Among these light sources, the CCFL type is actively used for a large screen color TFT LCD because it can be configured to have a long lifespan and a low power consumption and to be thin. The CCFL type uses a fluorescent discharge tube in which Mercury (Hg) gas with Argon (Ar), Neon (Ne), and etc. added to the Mercury gas is filled to be sealed in a low pressure so as to implement a penning effect.

Electrodes are formed at both ends of the discharge tube. A cathode is formed in a plate shape. When a voltage is applied, a charged particle in the discharge tube collides with the plate-shaped cathode and thus a secondary electron is generated, like a sputtering phenomenon. Accordingly, peripheral elements are excited, thus forming plasma. This causes the peripheral elements to radiate a strong ultraviolet ray. Then, the ultraviolet ray excites a fluorescent substance, and accordingly the fluorescent substance radiates a visual ray.

The aforementioned edge type means that a lamp unit is installed at a lateral surface of the light guide plate guiding light. The lamp unit is provided with a lamp radiating light, a lamp holder protecting the lamp by being inserted into both ends of the lamp and a lamp reflection plate for reflecting the light radiated from the lamp toward the light guide plate by encompassing an outer circumferential surface of the lamp and having one lateral surface inserted into the lateral surface of the light guide plate. The edge type where the lamp unit is installed at the lateral surface of the light guide plate is generally applied to a relatively small LCD device such as monitors of a laptop computer and a desktop computer. It has advantages that light is uniformly radiated, an endurance life is long and the LCD device can be easily formed in a thin film.

According to the edge type backlight unit, light radiated from the florescent lamp is collected on a light incidence surface of the light guide plate and then transferred to the liquid crystal display panel sequentially through the light guide plate, a diffusion plate and a prism sheet. However, the backlight unit using a related art florescent lamp has a low color reproduction range due to a light-emitting characteristic of the light source itself. It is difficult to obtain a backlight unit having a high brightness due to limitations on a size and a capacity of the fluorescent lamp.

Meanwhile, the direct type that is different from the edge type in aspects of a position and an arrangement of the light source has been actively developed as the LCD device having a large size (for example, more than 20 inches) started to be developed. The direct type is implemented by arranging a plurality of lamps in a row on the lower surface of the diffusion plate and then directly irradiating light toward the front surface of the liquid crystal panel. Since the direct type backlight unit has a utilization efficiency of light higher than the edge type backlight unit, it is mainly used for a large screen LCD device requiring a high brightness.

The aforementioned edge type and direct type backlight units use the fluorescent lamp as the light source. However, researches on a new light source are performed due to the recent concern about harmful gas filled in the fluorescent lamp, recently. Among the available light sources, the LED is focused as the new light source because it does not cause an environmental pollution, it can implement various colors and it can reduce the power consumption.

Hereafter, the related art LCD device using the LED light source will be explained with reference to FIGS. 1 to 5.

FIG. 1 is a section view schematically showing a LCD device having a backlight unit in accordance with the related art.

FIG. 2 is a planar view schematically showing an arrangement structure of a LED array and a light guide plate in accordance with the related art.

FIG. 3 is a view schematically showing the LED array in accordance with the related art.

FIG. 4 is a view schematically showing the LED array and the light guide plate in accordance with the related art.

FIG. 5 is a front view schematically showing that an inferior color split phenomenon occurs when light is incident onto the light guide plate under a state that the light guide plate and the LED array are spaced from each other by a predetermined distance (D), in the LCD device in accordance with the related art.

The LCD device in accordance with the related art, as shown in FIG. 1, includes a liquid crystal display panel 70 displaying images and a backlight unit 10 emitting light toward the liquid crystal display panel 70. Here, in the liquid crystal display panel 70, though it is not shown, liquid crystal is filled between an upper substrate and a lower substrate. Further, the liquid crystal display panel 70 is provided with a spacer for maintaining a uniform gap between the upper substrate and the lower substrate. The upper substrate of the liquid crystal display panel 70 is provided with a color filter, a common electrode, a black matrix, etc. The lower substrate of the liquid crystal display panel 70 is provided with signal lines such as a data line and a gate line. In addition, a Thin Film Transistor (TFT) is formed at an intersecting portion of the data line and the gate line. The TFT serves to convert a data signal to be transferred to a liquid crystal cell from the data line in response to a scan signal (gate pulse) from the gate line. Further, a pixel electrode is formed at a pixel area between the data line and the gate line. An upper polarizing plate is attached on the upper substrate of the liquid crystal display panel and a lower polarizing plate is attached on the lower substrate thereof.

Meanwhile, the backlight unit 10, as shown in FIGS. 1 and 2, includes a light guide plate 30 disposed to face the liquid crystal display panel 70, a reflection plate 20 disposed at a lower side of a LED array. The LED array includes a plurality of LEDs 11 composed of LEDs 11R, 11G, 11B of red, green and blue colors respectively disposed to face one lateral surface of the light guide plate 30. Further, the backlight unit 10 also includes an optical sheet 60 disposed between the light guide plate 30 and the liquid crystal display panel 70. The backlight unit 10 is inserted by fixing a support main 17 with a lower cover 21.

The optical sheet 60 is divided into a vertical optical sheet 61 and a horizontal optical sheet 62. Here, the optical sheet 60 serves to increase a front brightness of light passing through the optical sheet 60. That is, the optical sheet 60 is configured to transmit light only by a specific angle. Moreover, the light incident by other angles is reflected by an internal total reflection in the optical sheet 60 and thus returns to a lower portion of the optical sheet. Then, the returning light is reflected by the reflection plate 20.

The LED array composed of the plurality of LEDs 11, as shown in FIGS. 2-4, is fixed on a Package Circuit Board (PCB) 13 formed of a metallic material, and the PCB 13 is installed in the support main 17. Further, a connector 80 is provided at an edge portion of an upper surface of the PCB 13 so as to electrically connect each LED 11 of the LED array to an external driving circuit through a cable 15.

In addition, light guide plate stoppers 19 are provided at both edge portions inside of the support main 17 so as to protect the LEDs 11 and the light guide plate 30 from vibration of a product and prevent the LEDs from being damaged by contact between the LEDs 11 and the light guide plate 30. Here, the light guide plate stoppers 19 are disposed at both sides inside of the support main 17 corresponding to both edge portions of the light guide plate 30 so as to contact the both edge portions of the light guide plate 30 and thus support the same. The light guide plate stoppers 19 are slightly higher than the LEDs 11 so as to contact and support the light guide plate 30, while maintaining some distance between the LEDs 11 and the light guide plate 30. Accordingly, it is capable of preventing the light guide plate 30 from directly contacting the LED array due to vibration of the product.

Here, the LED array, as shown in FIGS. 1 and 2, is disposed to be spaced apart from a light incidence surface 30a of the light guide plate 30 by a predetermined distance (D) corresponding thereto. Here, the red LED 11R and the blue LED 11B disposed at the outer most portion of the both edge portions of the LED array are inwardly spaced from both side ends of the light incidence surface 30a of the light guide plate 30 by a predetermined distance. Further, the connector 80, as shown in FIGS. 3 and 4, is disposed at a position corresponding to one edge portion of the light incidence surface 30a adjacent to the lateral surface of the light guide plate 30, that is, at one edge portion of the upper surface of the PCB 13.

However, the LCD device in accordance with the related art has the following problems. In the LCD device according to the related art, the emitted light cannot be implemented in white, but can only be implemented in other colors. That is, a red light is emitted at a left end of the light guide plate by the red LED and a blue light is emitted at a right end of the light guide plate by the blue LED, as shown in FIG. 5 as "A" and "B", depending on a wavelength and a light intensity of the R, G, B or arrangement positions and a sequence of the R, G, B LED array, when applying the R, G, B LEDs. Since the light guide plate and the LED array are spaced from each other by a predetermined gap therebetween (e.g., "D" of FIG. 1), the red light is emitted at the left end of the light guide plate and the blue light is emitted at the right end of the light guide plate. Particularly, a desired white light is not reproduced at the end of a light incidence portion of the light guide plate due to a color split phenomenon at the edge portions of the LCD device, which are both ends of the light guide plate.

The reason why the color split phenomenon occurs is as follows. Since the light emitted from a LED disposed at the end of the LED array is relatively more intensive than the light emitted from an adjacent LED, the desired white light is not reproduced at the end of the light incidence portion of the light guide plate by the LEDs implementing other colors even when a power is precisely applied to each LED.

Meanwhile, in the LCD device in accordance with the related art, power consumption and a heat generation increase because the number of LEDs in the related art is higher than when white LEDs are used instead. In order to control the increase of the heat generation, a metallic PCB is used for the LCD device. When the metallic PCB is used the LCD device, additional cable and connector are required to connect the LED driving unit.

Thus, the LEDs cannot be disposed at one edge portion of an upper surface of the metallic PCB on which the LED array is disposed. Further, since the cable and connector are disposed at the edge portion of the upper surface of the metallic PCB, there is decreased available space on the metallic PCB for the LEDs to be disposed, and thus the number of LEDs that can be disposed on the metallic PCB may be decreased.

Furthermore, in order to prevent the LED array from being damaged by the contact between the LED array and the light guide plate, a light guide plate stopper (LGP stopper) should be additionally disposed at both edge portions in the support main, apart from the PCB on which the LED array is disposed. Accordingly, a structure of the LCD device may be complex and a fabrication cost for the LCD device may increase.

SUMMARY OF THE INVENTION

Therefore, an object of the present invention is to provide a LCD device which is capable of removing an inferior color split phenomenon at outer portions and edge portions of a light guide plate by mixing desired colors in the light guide plate to exit the light resulting from disposing lateral surfaces of the light guide plate and ends of light emission surfaces of LEDs disposed at both ends of a LED array to be consistent with each other.

Another object of the present invention is to provide an LCD device which addresses the limitations and disadvantages associated with the related art.

To achieve these and other advantages and in accordance with the purpose of the present invention, as embodied and broadly described herein, there is provided a LCD device comprising, a liquid crystal display panel, a light guide plate disposed below the liquid crystal display panel, and a LED array composed of a plurality of LEDs, wherein lateral surfaces of LEDs disposed at both ends among the plurality of LEDs are consistent with both lateral surfaces of the light guide plate and light emission surfaces of the LEDs are disposed to be close to a light incidence surface of the light guide plate.

Further, in accordance with another embodiment of the present invention, there is also provided a LCD device comprising, a liquid crystal display panel, a light guide plate disposed below the liquid crystal display panel, and a LED array composed of a plurality of LEDs, wherein at least half of light emission surfaces of the LEDs disposed at both ends among the plurality of LEDs is overlapped with a light incidence surface adjacent to lateral surfaces of the light guide plate and the light emission surfaces of the LEDs are disposed to be close to the light incidence surface of the light guide plate.

In another aspect, an embodiment of the present invention provides a LCD panel including liquid crystal, and a backlight unit including a light emitting diode (LED) array including a plurality of LEDs, the plurality of LEDs having a peripheral LED disposed at a peripheral end of the LED array, and a light guide plate disposed below the LCD panel, each LED having a light emission surface to emit light to a light incidence surface of the light guide plate, wherein the emission surface of the peripheral LED completely covers a peripheral end of the light incidence surface, the peripheral end of the light incidence surface being an area adjacent to a lateral surface of the light guide plate.

In another aspect, an embodiment of the present invention provides a backlight unit of a liquid crystal display (LCD) device, the backlight unit including a light emitting diode (LED) array including a plurality of LEDs, the plurality of LEDs having a peripheral LED disposed at a peripheral end of the LED array, and a light guide plate disposed below the LCD panel, each LED having a light emission surface to emit light to a light incidence surface of the light guide plate. The emission surface of the peripheral LED completely covers a peripheral end of the light incidence surface, the peripheral end of the light incidence surface being an area adjacent to a lateral surface of the light guide plate.

In another aspect, an embodiment of the present invention provides a liquid crystal display (LCD) device including a LCD panel including liquid crystal, and a backlight unit including a light emitting diode (LED) array including a plurality of LEDs, and a light guide plate disposed below the LCD panel, each LED having a light emission surface to emit light to a light incidence surface of the light guide plate, wherein a gap between the light emission surfaces of the LEDs and the light incidence surface of the light guide plate is a sufficient distance for a light of the LEDs within a range of a viewing angle of a light of the LEDs to be incident onto the light guide plate The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

Description will now be given in detail of the preferred embodiments of the present invention, with reference to the accompanying drawings.

Figure 6:
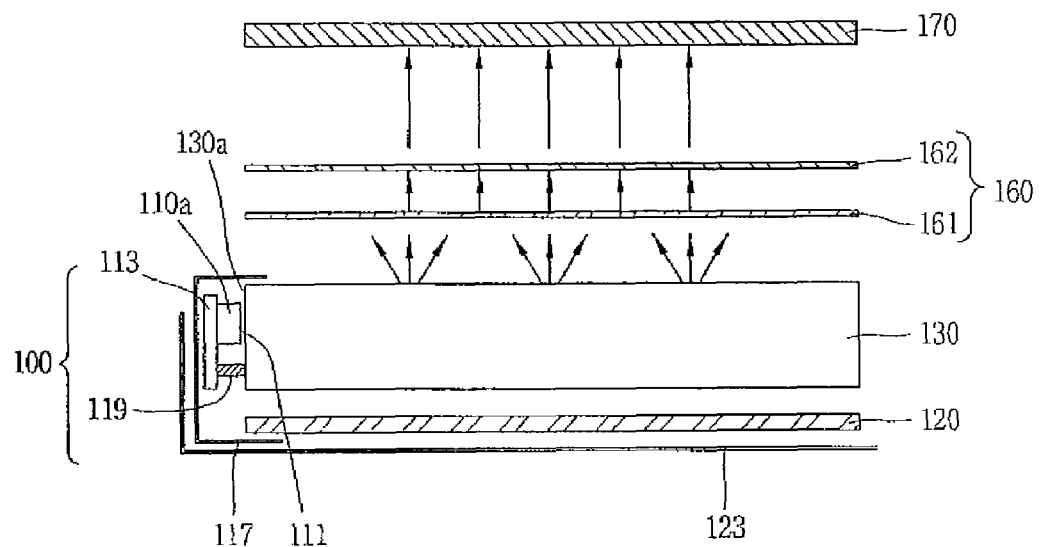
FIG. 6 is a section view showing a LCD device in accordance with a preferred embodiment of the present invention.

FIG. 6 is a section view showing a LCD device in accordance with a preferred embodiment of the present invention.

Figure 7:
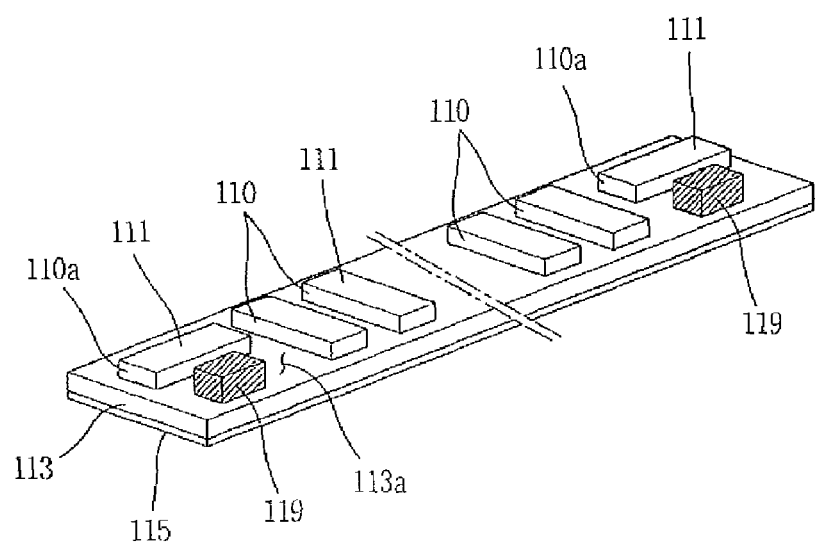
FIG. 7 is a view schematically showing a LED array in accordance with the preferred embodiment of the present invention.

FIG. 7 is a view schematically showing a LED array in accordance with the preferred embodiment of the present invention.

Figure 8:
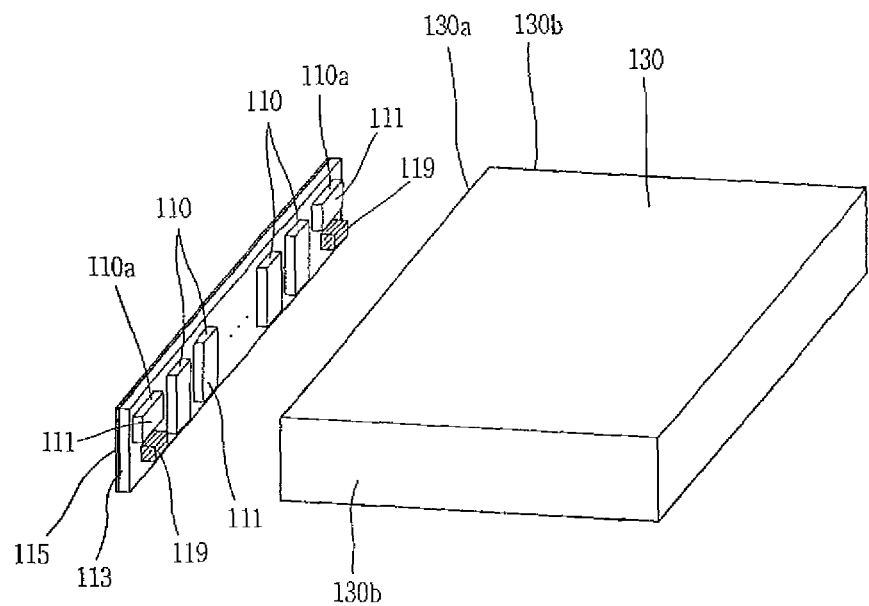
FIG. 8 is a view schematically showing the LED array and a light guide plate in accordance with the preferred embodiment of the present invention.

FIG. 8 is a view schematically showing the LED array and a light guide plate in accordance with the preferred embodiment of the present invention.

Figure 9:
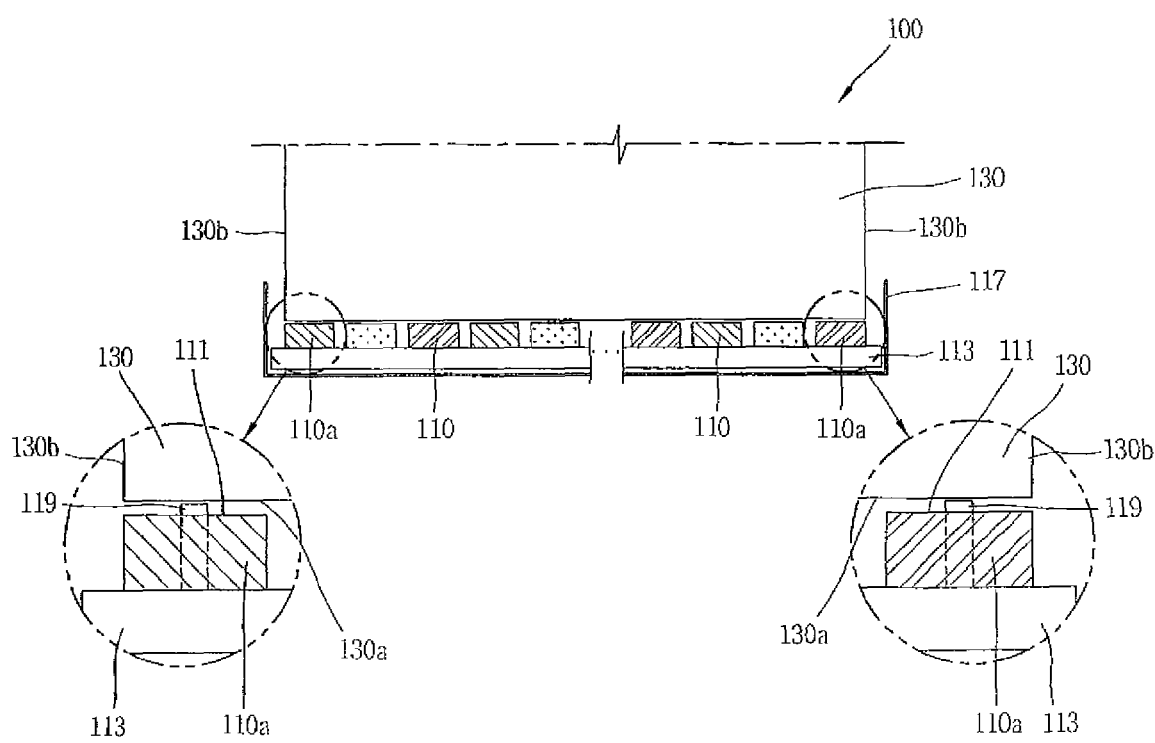
FIG. 9 is a planar view schematically showing an arrangement structure of the LED array and the light guide plate in accordance with the preferred embodiment of the present invention.

FIG. 9 is a planar view schematically showing an arrangement structure of the LED array and the light guide plate in accordance with the preferred embodiment of the present invention.

Figure 10:
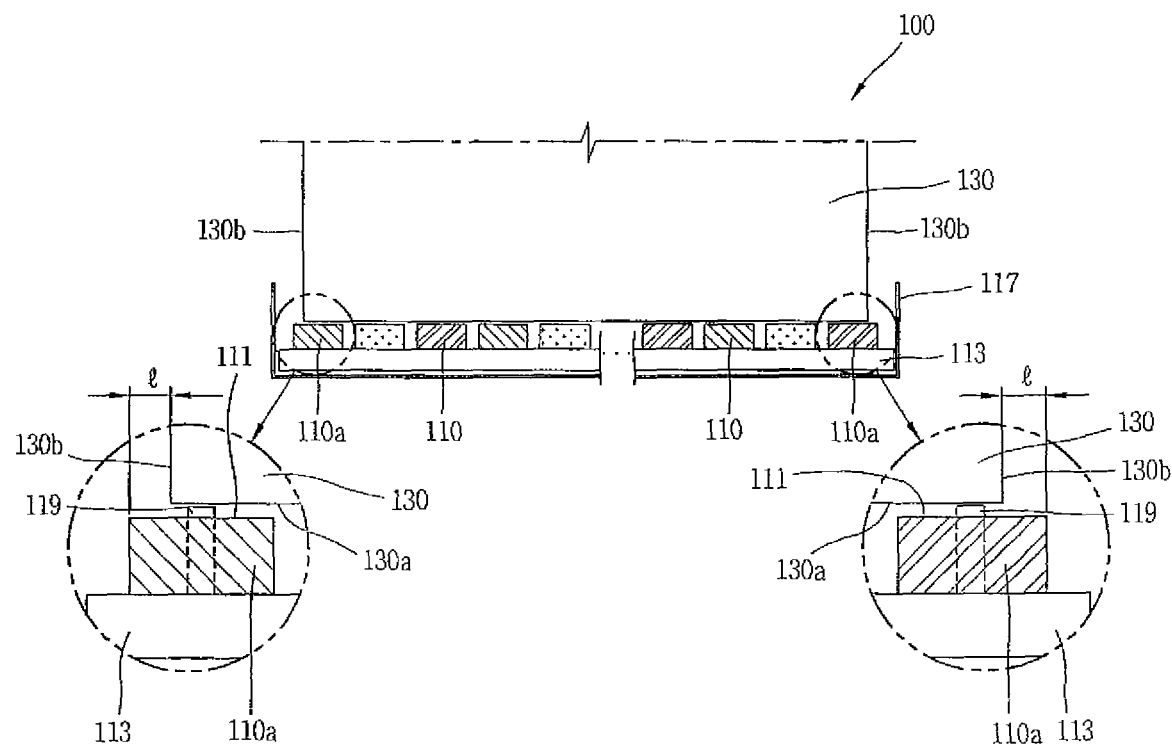
FIG. 10 is a planar view schematically showing an arrangement structure of a LED array and a light guide plate in accordance with another embodiment of the present invention.

FIG. 10 is a planar view schematically showing an arrangement structure of a LED array and a light guide plate in accordance with another embodiment of the present invention.

Figure 11:
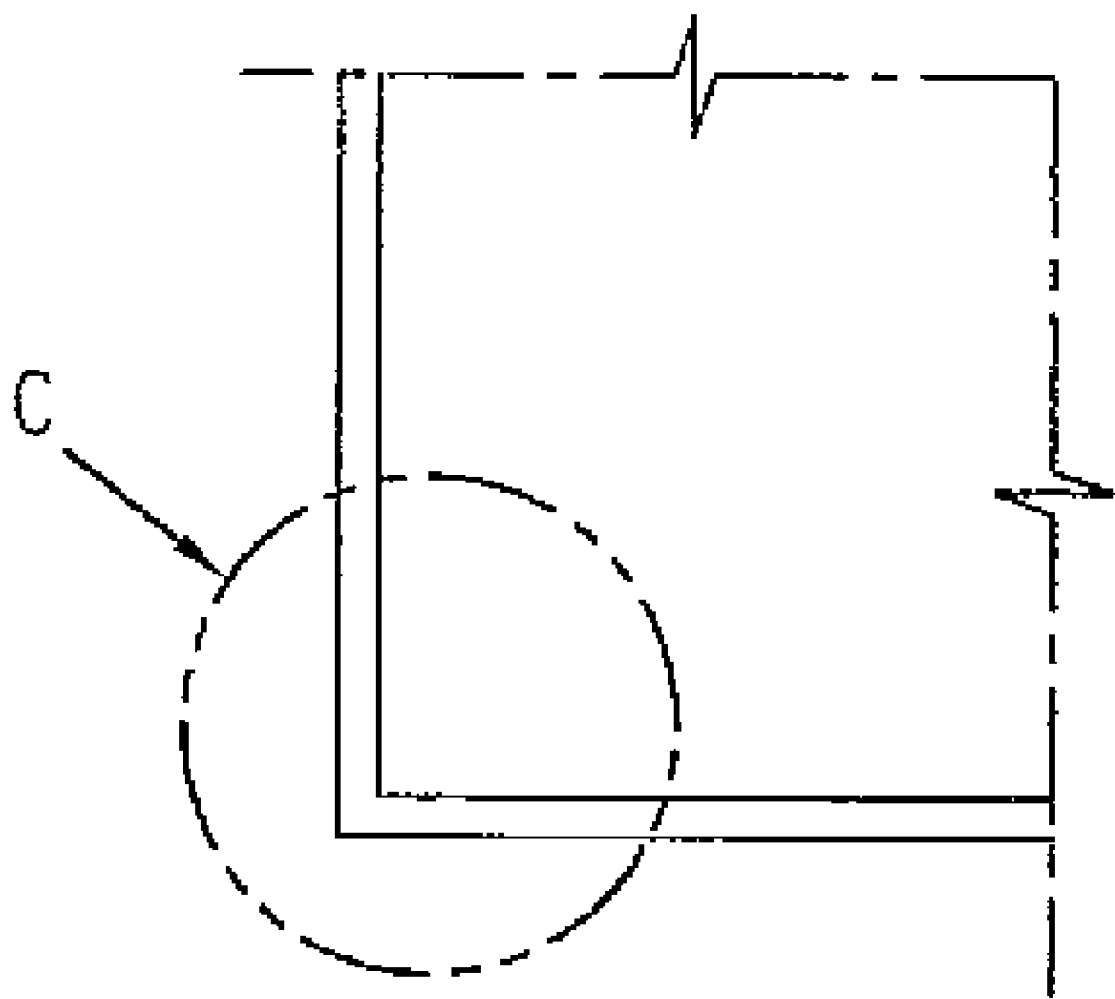
FIG. 11 is a front view schematically showing that an inferior color split phenomenon at both ends of a light incidence surface of the light guide plate is removed when light is incident onto the light guide plate under a state that ends of light emission surfaces of LEDs disposed at both ends of a LED array are disposed to be close to lateral surfaces of the light guide plate, in the LCD device in accordance with the preferred embodiment of the present invention.

FIG. 11 is a front view schematically showing that an inferior color split phenomenon at both ends of a light incidence surface of the light guide plate is removed when light is incident onto the light guide plate under a state that ends of light emission surfaces of LEDs disposed at both ends of a LED array are disposed to be close to lateral surfaces of the light guide plate, in the LCD device in accordance with the preferred embodiment of the present invention.

The LCD device in accordance with the present invention, as shown in FIG. 6, includes a liquid crystal display panel 170 displaying images and a backlight unit 100 emitting light toward the liquid crystal display panel 170. Further, a plurality of optical sheets 161 and 162 are disposed below the liquid crystal display panel 170.

Here, in the liquid crystal display panel 170, though it is not shown, liquid crystal is filled between an upper substrate and a lower substrate. Further, the liquid crystal display panel 170 is provided with a spacer for maintaining a uniform gap between the upper substrate and the lower substrate. The upper substrate of the liquid crystal display panel 170 is provided with a color filter, a common electrode, a black matrix, and etc. Further, the lower substrate of the liquid crystal display panel 170 is provided with signal lines such as a data line and a gate line. In addition, a Thin Film Transistor (TFT) is formed at an intersecting portion of the data line and the gate line. The TFT serves to convert a data signal to be transferred to a liquid crystal cell from the data line in response to a scan signal (gate pulse) from the gate line. And, a pixel electrode is formed at a pixel area between the data line and the gate line.

Further, a pad region to which the data lines and the gate lines are respectively connected is formed at one lateral portion of the lower substrate. Moreover, a Tape Carrier Package (TCP, not shown) in which a driver integrated circuit for applying driving signals to the TFT is attached on the pad region. The TCP serves to supply the data signal to the data lines and the scan signal to the gate lines from the driver integrated circuit. In addition, an upper polarizing plate is attached on the upper substrate of the liquid crystal display panel and a lower polarizing plate is attached on the lower substrate thereof.

Meanwhile, the backlight unit 100, as shown in FIGS. 6 to 8, includes a light guide plate 130 disposed to face the liquid crystal display panel 170, a reflection plate 120 disposed at a lower side of a plurality of LEDs 110, 110a. The plurality of LEDs are composed of LEDs 11R, 11G, 11B of red, green and blue colors respectively disposed to face a light incidence surface 130a of the light guide plate 130 so as to form a LED array. Further, the backlight unit 100 also includes an optical sheet 160 disposed between the light guide plate 130 and the liquid crystal display panel 170, wherein the optical sheet 160 includes a plurality of optical sheets 161 and 162. Here, as the backlight unit 100 becomes small, thin and light, the LED used as a light source has advantages in aspects of a power consumption, a thickness, a weight and a brightness, when compared with a fluorescent lamp that is generally used for a backlight unit.

The backlight unit 100 can be fixed by a support main 117. The liquid crystal display panel 170 disposed at the upper portion of the backlight unit 100 can be protected by a top-chassis, though it is not shown. In this case, the top-chassis and the support main 117 may be coupled to each other with receiving the backlight unit 100 and the liquid crystal display panel 170 therebetween.

Meanwhile, the LEDs 110, 110a forming the LED array, as shown in FIGS. 7 and 8, are disposed on a non-conductive flexible Printed Circuit Board (PCB) 113, and composed of a plurality of red, green, blue LEDs 110R, 110G, 110B. In detail, among the LEDs 110, 110a disposed on the flexible PCB 113 and forming the LED array, the LEDs 110a disposed at both edge portions are disposed in a manner rotated at an angle relative to the adjacent LEDs 110. For example, the LEDs 110a can be disposed with being rotated from an adjacent LEDs 110 in a vertical direction by a specific angle, e.g., 90°. Further, light guide plate stoppers (LGP stoppers) 119 for preventing the LEDs 110, 110a and the light guide plate 130 from being damaged due to contact between the LEDs 110 and the light guide plate 130 are disposed at spaces 113a of the PCB 113 obtained by rotating the LEDs 110a by the specific angle. Here, the LGP stoppers 119 are disposed to be adjacent to the LEDs 110a disposed at both edge portions of the PCB 113, so as to contact and support both edge portions of the light guide plate 130.

Preferably, the LGP stoppers 119 are slightly higher than the LEDs 110, 110a of the LED array so as to contact and support the light guide plate 130, while maintaining some distance between the LEDs 110, 110a and the light guide plate 130. Accordingly, it is capable of preventing the light guide plate 130 from contacting the LEDs 110, 110a due to vibration of the product. Particularly, the LGP stoppers 119 have a height high enough for the LEDs 110, 110a not to contact the light incidence surface 130a of the light guide plate 130. Further, the LGP stoppers 119 can be formed to attenuate or absorb impact. For example, the LGP stoppers 119 may be formed of a flexible material such as rubber or a material that can attenuate or absorb impact. The LGP stoppers 119, for example, may also include an elastic spring type device to attenuate or absorb impact.

In addition, a metallic plate 115 connected to a LED driving circuit is coupled to a lower surface of the flexible PCB 113. Here, the metallic plate 115 serves to prevent the flexible PCB 113 from being bent and to restrain heat generated from the plurality of LEDs from increasing. The flexible PCB 113 couples the metallic plate 115 electrically connected to the driving circuit of the LED array to the non-conductive Flexible PCB (FPCB) 113, instead of using a conventional metallic PCB and a cable and a connector for the conventional metallic PCB. Accordingly, it is capable of removing the conventional connector and additionally disposing the LEDs 110a at a position where the connector is removed. That is, the LEDs 110a are disposed at spaces obtained at both edge portions of the FPCB 113. The driving circuit of the plurality of LEDs 110, 110a includes a control circuit for emitting light from the LEDs 110R, 110G, 110B generating specific color light such as red light, green light and blue light as a point source.

Meanwhile, the plurality of optical sheets 161, 162 serve to diffuse light emitted from the light guide plate 130 and convert a path of the light to be perpendicular to the liquid crystal panel 170, thereby enhancing light efficiency. Here, the optical sheet 160 may be configured with a vertical optical sheet 161 and a horizontal optical sheet 162, or configured with a single optical sheet. Further, the optical sheet 160 may be configured with more than two optical sheets, for example, multiple vertical optical sheets and/or horizontal optical sheets. Here, the optical sheet 160 serves to increase a front brightness of light passing therethrough. That is, the optical sheet 160 is configured to transmit light only by a specific angle. Moreover, light incident by other angles is reflected by an internal total reflection in the optical sheet 160 and thus returns to a lower portion of the optical sheet. Then, the returning light is again reflected by the reflection plate 120.

Meanwhile, light emission surfaces 111 of the LEDs 110, 110*a* are, as shown in FIG. 9, disposed to closely face the light incidence surface 130*a* of the light guide plate 130. Here, the LEDs 110, 110*a* are close to the light incidence surface 130*a* without contacting the light incidence surface 130*a* of the light guide plate 130. Particularly, a gap between each light emission surface 111 of the plurality of LEDs 110, 110*a* and the light incidence surface 130*a* of the light guide plate 130 provides sufficient distance for light within a range of a viewing angle of light of the LEDs 110, 110*a* to be incident onto the light guide plate 130. The viewing angle of an LED is the angle, measured with respect to the center axis through the center of the lens of the LED, where the light intensity is reduced to one half of the light intensity of the center axis. In this instance, the distance of the gap between each light emission surface 111 of the plurality of LEDs 110, 110*a* and the light incidence surface 130*a* of the light guide plate 130 may be equal to or less than a width of each LED.

Each outer end of the light emission surfaces 111 of the LEDs 110*a* disposed at both ends of the LED array is, as shown in FIG. 9, disposed to be on the same line with lateral surfaces 130*b* of the light guide plate 130. That is, each end of the light emission surfaces 111 of the LEDs 110*a* disposed at both ends of the LED array is disposed to be consistent with the lateral surfaces 130*b* of the light guide plate 130. Here, the LEDs 110*a* disposed at both ends of the LED array may be implemented as any of the red, green and blue LEDs. Further, as shown in FIG. 9, each LED 110, 110*a* of the LED array is disposed to be close to the incidence surface 130*a* of the light guide plate 130, accordingly all or most of the light emitted from each LED 110, 110*a* is incident into the light guide plate 130. Particularly when the lateral surfaces 130*b* of the light guide plate 130 in right and left are disposed to be consistent with each end of the light emission surfaces of the LEDs 110*a* of the LED array, the viewing angle of the LEDs 110*a* is generally ±50~60° according to a light exit direction. Meanwhile, when ends of the light emission surfaces 111 of the LEDs 110*a* are disposed to be consistent with the lateral surfaces 130*b* of the light guide plate 130, all or most of the light emitted from the LEDs 110, 110*a* of the LED array is incident into the light guide plate 130.

In a LCD device in accordance with another embodiment of the present invention, as shown in FIG. 10, the LEDs 110*a* are disposed at both ends to be close to the light incidence surface 130*a* under a state that at least more than half of the light emission surfaces 111 of the LEDs 110*a* is overlapped with the light incidence surface 130*a* adjacent to the lateral surfaces 130*b* of the light guide plate 130 or under a state that at least less than half of the light emission surfaces 111 of the LEDs 110*a* is outwardly exposed from the lateral surfaces 130*b* of the light guide plate 130, with disposing the LEDs 110 of the LED array. Here, the light emitted from the LEDs 110, 110*a* is incident into the light guide plate 130.

Figure 1:
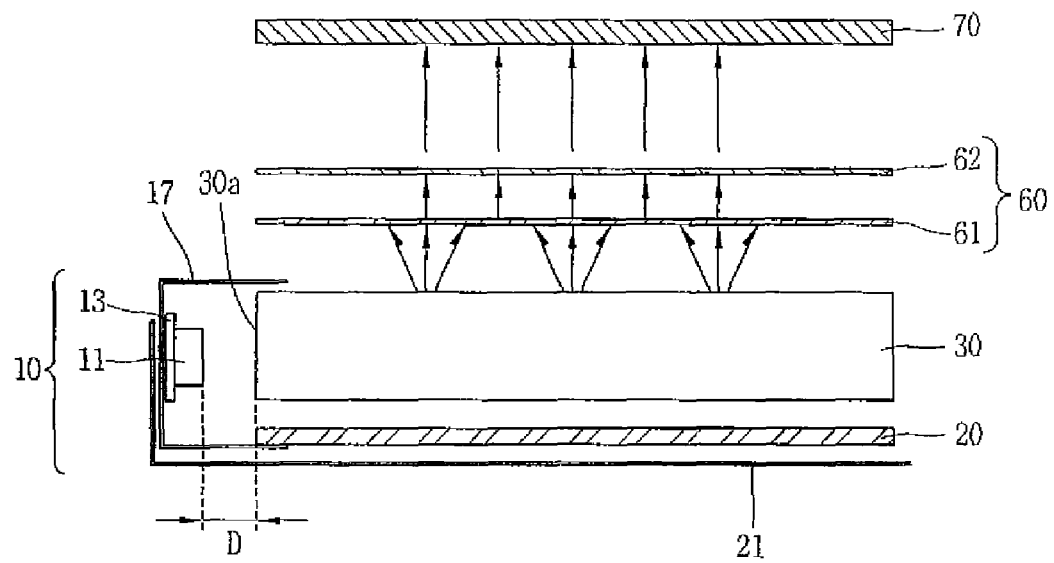
FIG. 1 is a section view schematically showing a LCD device having a backlight unit in accordance with the related art.
Figure 2:
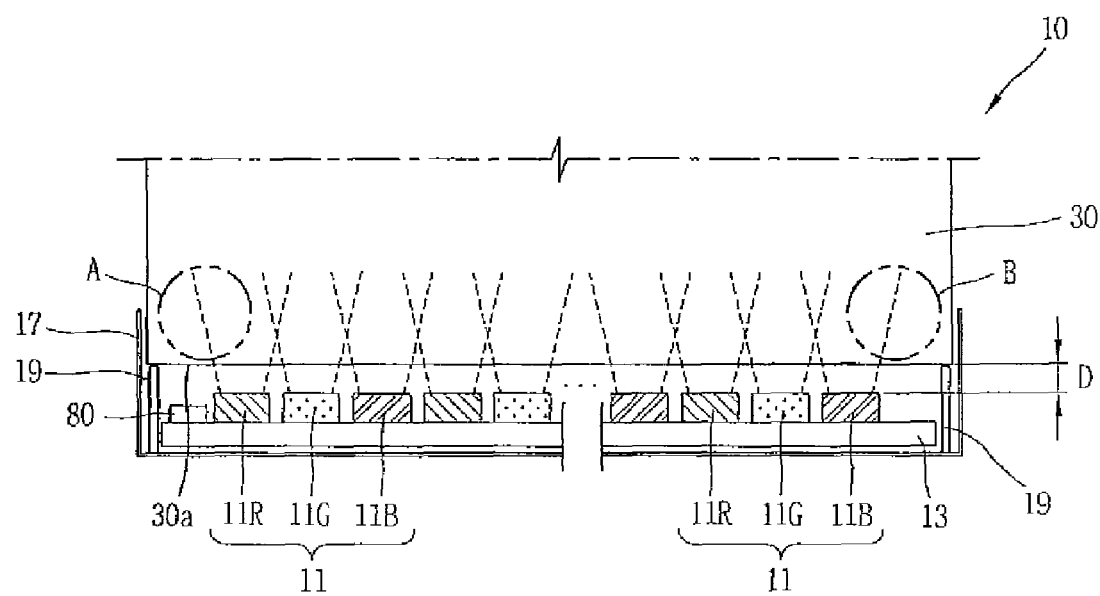
FIG. 2 is a planar view schematically showing an arrangement structure of a LED array and a light guide plate in accordance with the related art.
Figure 3:
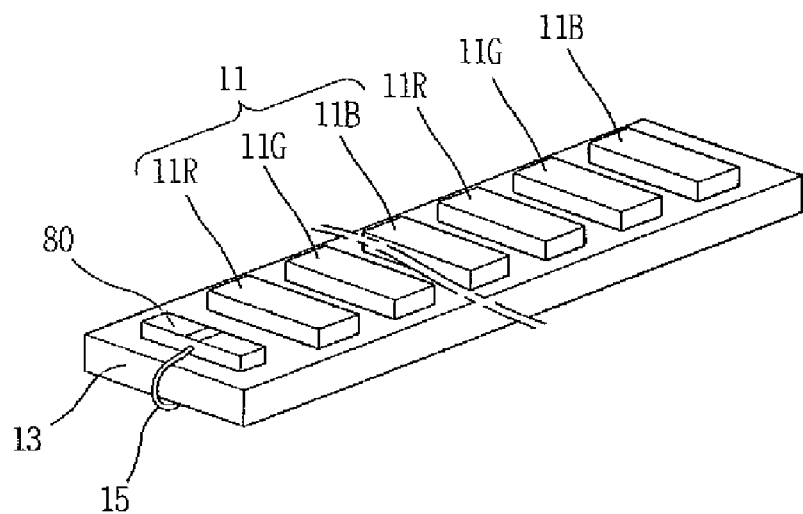
FIG. 3 is a view schematically showing the LED array in accordance with the related art.
Figure 4:
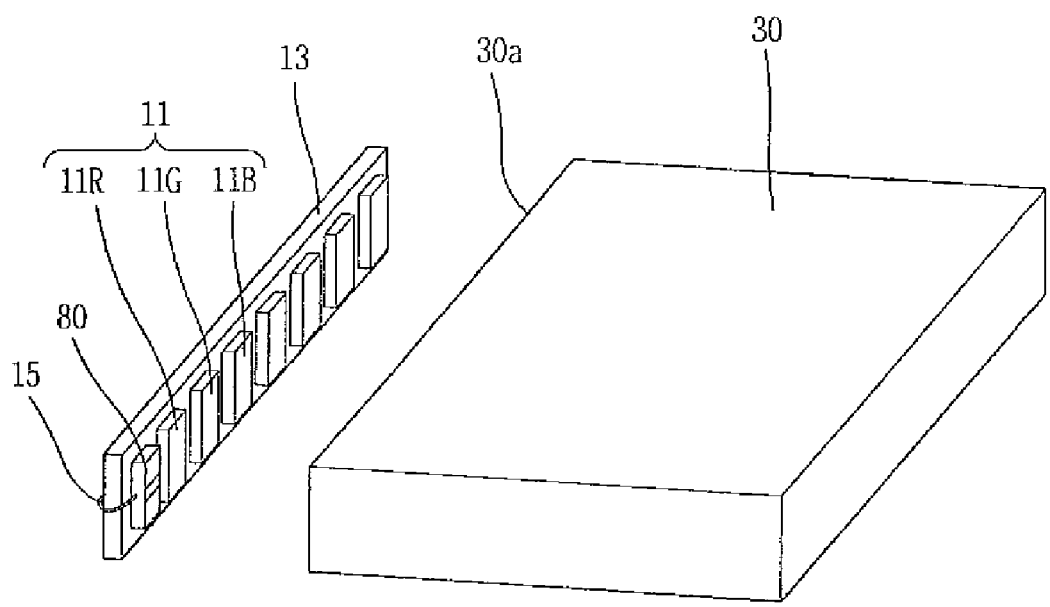
FIG. 4 is a view schematically showing the LED array and the light guide plate in accordance with the related art.
Figure 5:
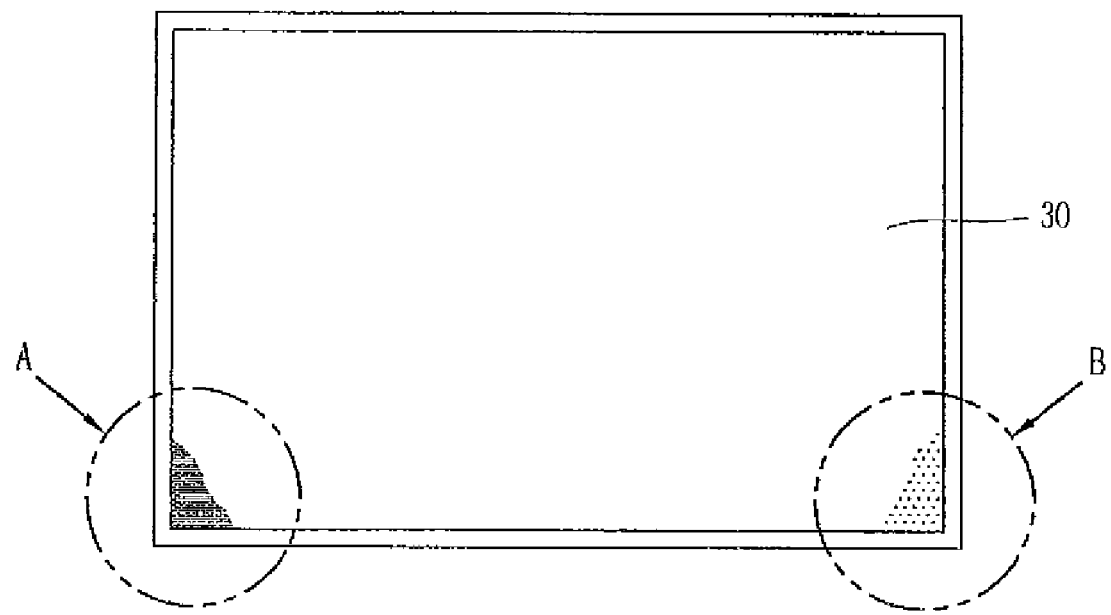
FIG. 5 is a front view schematically showing that an inferior color split phenomenon occurs when light is incident onto the light guide plate under a state that the light guide plate and the LED array are spaced from each other by a predetermined distance (D), in the LCD device in accordance with the related art.

Thus, an embodiment of the present invention discloses disposing the light emission surfaces 111 of LEDs and the light incidence surface 130*a* of the light guide plate to be close to each other by disposing the lateral surfaces 130*b* of the light guide plate 130 and the ends of the light emission surfaces 111 of the LEDs 110*a* to be consistent with each other, in accordance with one embodiment, or disposing at least more than half of the light emission surfaces 111 of the LEDs 110*a* of the LED array to be overlapped with the light incidence surface 130*a* adjacent to the lateral surfaces 130*b* of the light guide plate 130, in accordance with another embodiment. When one of these embodiments is applied according to the present invention, the difference in an optical brightness between the region emitted by LEDs 110*a* and the region emitted by the adjacent LEDs 110 does not exist any more. As shown in "C" of FIG. 11, a brightness ratio based on color for white light can be maintained even at both ends of the light guide plate 130. Thus, the embodiments of the present invention is capable of removing a non-mixed region, such as "A" or "B" shown in FIG. 5, in which the different color lights are not properly mixed into white light in a backlight effective light emission region.

Accordingly, a white Flat Fluorescent Lamp by which the light is uniformly incident onto the light guide plate 130 from the LEDs 110, 110*a* of the LED array is formed.

The LCD device in accordance with the preferred embodiments of the present invention has the advantages as follows.

In the LCD device in accordance with the present invention, under the state that the lateral surfaces of the light guide plate and ends of light emission surfaces of the LEDs disposed at both ends of the LED array are disposed to be consistent with each other, the light emission surfaces of the LEDs and the light incidence surface of the light guide plate are disposed to be close to each other or at least more than half of the light emission surfaces of the LEDs is disposed to be overlapped with the light incidence surfaces adjacent to the lateral surfaces of the light guide plate. Therefore, all or most of the light emitted from the LED array is incident into the light guide plate.

Accordingly, the difference in the optical brightness between the region emitted by the LEDs and the region emitted by the adjacent LEDs does not exist any more. Thus, the brightness ratio based on color for white light can be maintained even at the ends of the light guide plate, and accordingly it is capable of removing the non-mixed region in which the lights are mixed into white light in the backlight effective light emission region.

In addition, the light emission surfaces of the LEDs and the light incidence surface of the light guide plate are disposed to be close to each other, and accordingly it is capable of removing an inferior color split phenomenon at edge portions in the backlight unit which laterally emits light. Accordingly, it is capable of enhancing a quality of a screen and of applied to every model of the backlight units to which the light guide plate is applied.

In addition, according to the embodiments of the present invention, the connector is not disposed on the PCB together with the LED array and the LEDs are disposed at a position where the connector would be disposed in the related art, in a manner rotated at a specific angle (e.g. 90°) relative to adjacent LEDs. Then, the light guide plate stoppers are disposed at the spaces obtained thereby on the PCB so as to prevent the LEDs and the light guide plate from contacting each other. Accordingly, it is capable of efficiently utilize the space of the product. Further, as the LEDs can be additionally disposed at the ends of the PCB, it is capable of enhancing light efficiency of the product.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
a LCD panel including liquid crystal; and
a backlight unit including:
a light emitting diode (LED) array including a plurality of LEDs, the plurality of LEDs having a peripheral LED disposed at a peripheral end of the LED array; and
a light guide plate disposed below the LCD panel, each LED having a light emission surface to emit light to a light incidence surface of the light guide plate,
wherein the emission surface of the peripheral LED completely covers a peripheral end of the light incidence surface, the peripheral end of the light incidence surface being an area adjacent to a lateral surface of the light guide plate.

2. The LCD device of claim 1, wherein a gap between the light emission surfaces of the LEDs and the light incidence surface of the light guide plate is a sufficient distance for a light of the LEDs within a range of a viewing angle of the light of the LEDs to be incident onto the light guide plate.

3. The LCD device of claim 1, wherein each LED array is disposed on a flexible PCB.

4. The LCD device of claim 3, wherein a metallic plate is provided under the flexible PCB.

5. The LCD device of claim 1, wherein the peripheral LED is disposed to be substantially perpendicular to adjacent LEDs.

6. The LCD device of claim 5, wherein spaces are provided at the both edge portions of the PCB by the peripheral LED disposed to be substantially perpendicular to the adjacent LEDs.

7. The LCD device of claim 6, wherein light guide plate stoppers are provided at the spaces so as to contact and support the light guide plate.

8. The LCD device of claim 7, wherein the light guide plate stoppers are disposed to be higher than the LEDs.

9. The LCD device of claim 7, wherein the light guide plate stoppers includes an elastic structure or an elastic material that can absorb or attenuate impact.

10. The LCD device of claim 9, wherein the elastic structure or the elastic material included in the light guide plate stoppers is a spring or a rubber, respectively.

11. The LCD device of claim 1, further comprising an optical sheet interposed between the LCD panel and the light guide plate and a reflection plate disposed below the light guide plate so as to diffuse light irradiated from the light guide plate and convert a path of the light to be perpendicular to the LCD panel.

12. The LCD device of claim 1, further comprising a support main and a lower cover coupled to each other with receiving the LCD panel and the light guide plate therebetween.

13. The LCD device of claim 1, wherein at least half of the light emission surface of the peripheral LED is overlapped with the peripheral end of the light incidence surface.

14. The LCD device of claim 1, wherein the lateral surface of the peripheral LED disposed at the end of the LED array corresponds with the lateral surface of the light guide plate and all of the light emission surfaces of the peripheral LEDs are overlapped with the light incidence surface of the light guide plate.

15. A backlight unit for a liquid crystal display (LCD) device, the backlight unit comprising:
a light emitting diode (LED) array including a plurality of LEDs, the plurality of LEDs having a peripheral LED disposed at a peripheral end of the LED array; and
a light guide plate disposed below the LCD panel, each LED having a light emission surface to emit light to a light incidence surface of the light guide plate,
wherein the emission surface of the peripheral LED completely covers a peripheral end of the light incidence surface, the peripheral end of the light incidence surface being an area adjacent to a lateral surface of the light guide plate.

16. A liquid crystal display (LCD) device comprising:
a LCD panel including liquid crystal; and
a backlight unit including:
a light emitting diode (LED) array including a plurality of LEDs, and
a light guide plate disposed below the LCD panel, each LED having a light emission surface to emit light to a light incidence surface of the light guide plate,
wherein a gap between the light emission surfaces of the LEDs and the light incidence surface of the light guide plate is a sufficient distance for a light of the LEDs within a range of a viewing angle of the light of the LEDs to be incident onto the light guide plate.

17. The LCD device of claim 16, wherein a distance of the gap between the light emission surface of the LEDs and the light incidence surface of the light guide plate is equal to or less than a width of each LED.

18. The LCD device of claim 16, wherein the plurality of LEDs have a peripheral LED disposed at a peripheral end of the LED array, and the emission surface of the peripheral LED completely covers a peripheral end of the light incidence surface, the peripheral end of the light incidence surface being an area adjacent to a lateral surface of the light guide plate.

19. The LCD device of claim 18, wherein the lateral surface of the peripheral LED disposed at the end of the LED array corresponds with the lateral surface of the light guide plate and all of the light emission surfaces of the peripheral LEDs are overlapped with the light incidence surface of the light guide plate.

20. The LCD device of claim 18, wherein the peripheral LED is disposed to be substantially perpendicular to adjacent LEDs, and
wherein spaces are provided at the both edge portions of the PCB by the peripheral LED disposed to be substantially perpendicular to the adjacent LEDs.

21. The LCD device of claim 20, wherein light guide plate stoppers are provided at the spaces so as to contact and support the light guide plate.

* * * * *

UNITED STATES PATENT AND TRADEMARK OFFICE
CERTIFICATE OF CORRECTION

PATENT NO. : 7,944,527 B2  
APPLICATION NO. : 12/240548  
DATED : May 17, 2011  
INVENTOR(S) : Wook Jeon et al.

Page 1 of 1

It is certified that error appears in the above-identified patent and that said Letters Patent is hereby corrected as shown below:

ON THE TITLE PAGE:

Please insert the following:

-- (30)   Foreign Application Priority Data

Apr. 10, 2008   (KR)   ........................ 10-2008-0033342 --.

Signed and Sealed this
Sixteenth Day of August, 2011

David J. Kappos
*Director of the United States Patent and Trademark Office*